United States Patent Office 2,953,040
Patented Sept. 20, 1960

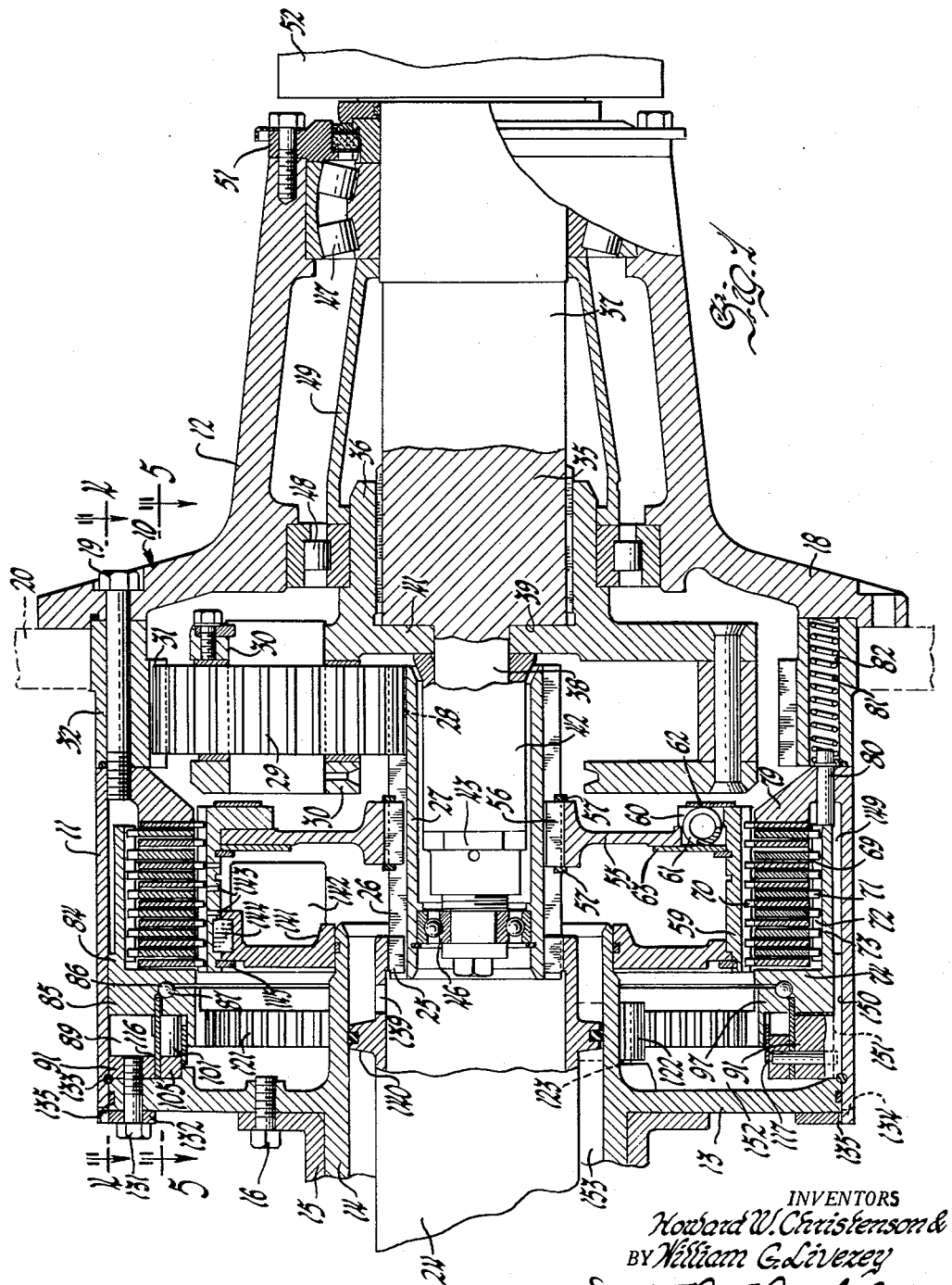

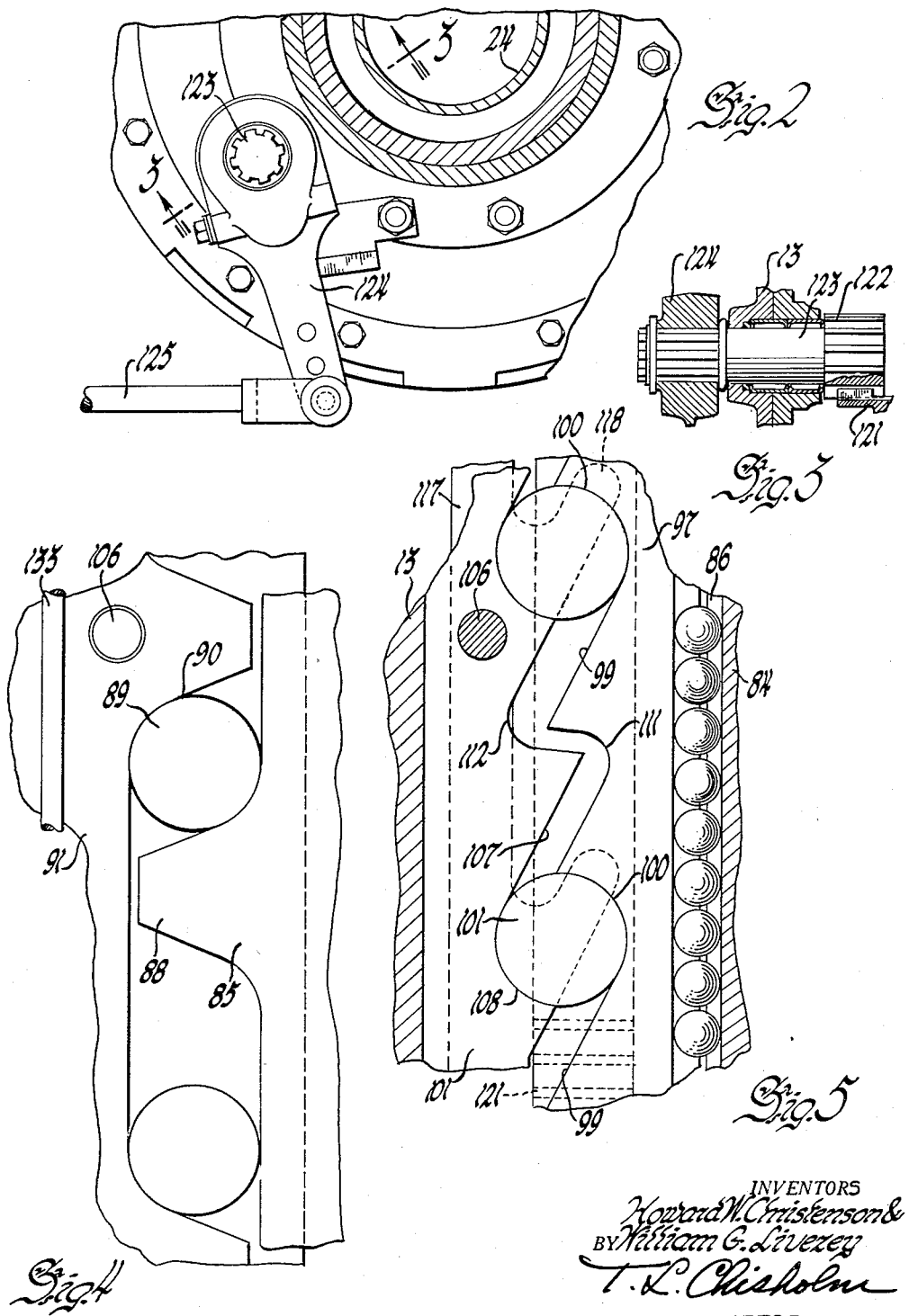

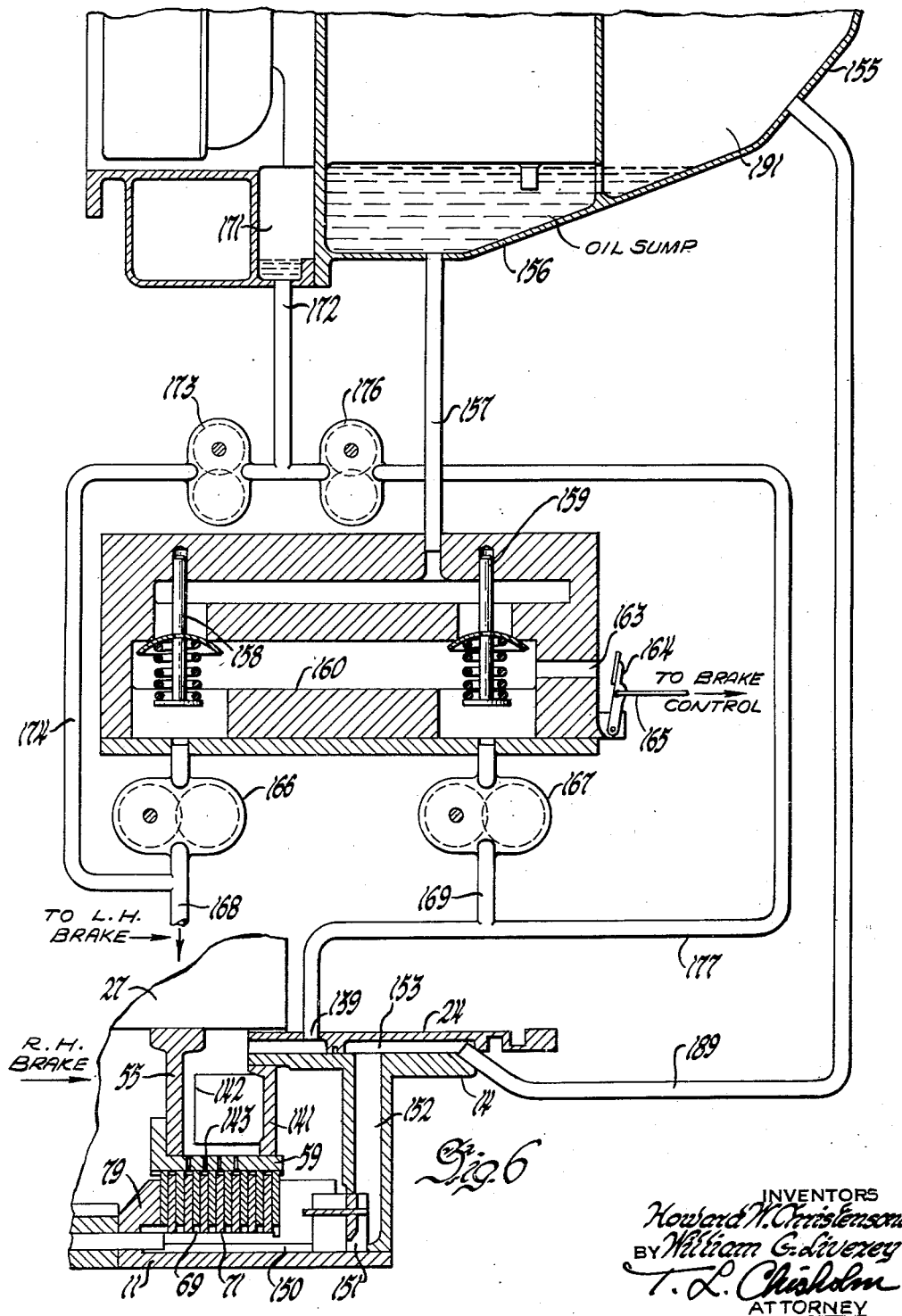

2,953,040

TRANSMISSION

Howard W. Christenson and William G. Livezey, Indianapolis, Ind., assignors to General Motors Corporation, Detroit, Mich., a corporation of Delaware Filed Jan. 26, 1955, Ser. No. 484,121

31 Claims. (Cl. 74—781)

This invention relates to a vehicle drive unit and more particularly to a reduction drive and brake unit.

The final drive assembly is driven by the hollow transmission output shaft which is connected by a coupling or sun gear sleeve shaft to the sun gear of a planetary reduction gear having the carrier connected to the output or track sprocket shaft. The sun gear and its sleeve shaft are freely mounted for rotation on the output shaft so that the sun gear rotates about the center of the planetary pinions with which it meshes. The rotatable drum of a multiple disc vehicle brake is also attached through a torsional vibration damper to the sun gear sleeve shaft. The multiple disc brake is lubricated and cooled by oil supplied through the hollow transmission output shaft and forced outwardly by a plurality of vanes or paddles located within and rotating with the annular rotary disc brake. The paddles maintain an annular body of oil within the brake housing to keep the brake submerged in oil while it is in operation. During this braking period the excess oil will be returned through the outlet from the base of the final drive sump to the transmission sump. When the braking operation is completed the flow of oil is reduced and air is blown through the brake assembly in order to evacuate the large body of cooling oil and to reduce the oil drag during normal operation of the vehicle but sufficient oil for lubrication is admitted with the air.

An object of the invention is to provide a brake unit which has high angle self-energizing cams operable to provide controlled self-energizing action to stop vehicle movement in either the forward or the reverse direction.

Another object of the invention is to provide in a final drive assembly a vehicle brake having a brake cooling system including a centrifugal pumping device located within the brake to force oil over the braking surfaces during brake application to cool the brake.

Another object of the invention is to provide in a self-energizing vehicle brake an apply cam structure wherein movement of the apply cam causes initial application of the brake to rotate a self-energizing cam in either a forward or reverse direction to effect self-energized brake application.

Another object of the invention is to provide in a final drive assembly wherein the transmission output shaft is connected through a planetary reduction gear to an output shaft driving the road drive element, an output shaft having an inwardly extending arbor supporting the sun gear shaft which also provides a coupling between the transmission output shaft, the brake, and the sun gear of the planetary reduction gear.

Another object of the invention is to provide in a final drive assembly wherein the transmission output shaft is connected to a sun gear of a planetary reduction gear which drives output shaft connected to the road drive element, a floating mounting supporting the sun gear on the output shaft for axially fixed rotation in mesh with the pinions and to permit radial movement to permit the sun gear to rotate about the center of the pinions with which it meshes.

A further object of the invention is to provide in a final drive assembly having a final drive shaft connected to the road drive elements and a multiplate brake which is self-energized in both directions, a torsional vibration damper in the connection between the final drive shaft and the rotary brake member.

A still further object of the invention is to provide a final drive assembly having a brake cooling and scavenging system wherein oil is supplied through the center of the drive shaft to the brake surfaces in small quantities during normal running to lubricate the brakes and is supplied in large quantities during brake actuation to cool the brakes and oil is scavenged through a drain passage extending from the base of the sump in the final drive assembly to the space between the transmission drive shaft and the housing to the main transmission sump.

These and other objects and advantages of the invention will become more evident by reference to the following detailed description of the accompanying drawings.

Fig. 1 shows a sectional view of the final drive assembly with parts broken away in section to show details.

Fig. 2 is a partial sectional view showing the brake control linkage.

Fig. 3 is a sectional view of Fig. 2 on the line 3—3.

Fig. 4 is a sectional view of Fig. 1 on the line 4—4.

Fig. 5 is a partial sectional view of Fig. 1 on the line 5—5.

Fig. 6 is a schematic view of the control system.

In Fig. 1 the vehicle brake and reduction drive unit is located in a housing 10 having a cylindrical portion 11 and a tapering portion 12 of reduced diameter. The inboard side of the housing 10 has an annular wall 13 which has integrally formed at the inner edge a cylindrical bushing 14. The bushing 14 fits within the end portion of the drive shaft housing 15 which is suitably flanged and secured by bolts 16 to the wall 13 of the housing 10. The housing portion 12 has an annular wall 18 part of which is joined by suitable bolts 19 to the cylindrical portion 11 of the housing 10. A portion of the annular wall 18 extends beyond the cylindrical portion 11 and is secured to a suitable portion of the vehicle frame 20. The drive shaft 24 which may be the transmission cross drive shaft or a coupling shaft connected to the cross drive shaft is suitably mounted in the drive shaft housing 15. Shaft 24 is located in and spaced from the cylindrical bushing 14 and has internal gear type splines 25 engaging the external gear teeth splines 26 on the sun gear sleeve shaft 27. The sun gear 28 formed by the splines 26 on the outboard end of the sun gear sleeve shaft 27 meshes with the planetary pinions 29 mounted on the planetary carrier 30 mounted on the output shaft 35. The pinions 29 also mesh with the ring gear 31 which is formed as an integral ring part 32 of the cylindrical portion 11 of the housing. The bolts 19 pass through the wall 18, the ring part of the housing 32 and main part of the housing portion 11 to secure the housing together as a unitary assembly. The planetary carrier 30 has a splined cylindrical flange 36 which is suitably splined to the large diameter portion 37 of the output shaft 35. The output shaft 35 also has a portion 38 of small diameter extending within the sun gear sleeve shaft 27. The carrier 30 has an annular portion 41 which fits against the shoulder 39 between the large diameter portion 37 and small diameter portion 38 of the output shaft 35. A locking sleeve 42 fits over the small portion 38 of the output shaft and holds the flange 41 against the shoulder 39. Suitable lock nuts 43 engaging a threaded portion of the small diameter shaft portion 38 hold the locking sleeve in place. The inner end of the end remote from the sun gear 28 of the sun gear sleeve shaft 27 is rotatably mounted on the ball bearing thrust bearing 46 mounted on the inner end of the small diameter shaft portion 38. The large portion 37 of the output shaft is supported by a roller thrust bearing 47 directly engaging shaft portion 37 at the outboard end of the housing portion 12 and by a roller bearing 48 located between the inboard end of the housing 12 and the sleeve portion 36 of the carrier 30. A spacing sleeve 49 is located between the bearings 47 and 48 to position them on the shaft portion 37. The bearings are held in place by a suitable locking and sealing flange 51 secured by suitable means to the outer face of the housing 12. A suitable flange 52 is provided on the outboard end of the shaft 37 to provide a mounting for the vehicle wheels or a sprocket drive for tracked vehicle.

The vehicle brake is connected to the output drive by a support plate 55 suitably splined at 56 to be connected to the splined sun gear sleeve shaft 27. The plate 55 is located axially on the sun gear shaft by means of snap rings 57 located at each side of the base of the disc. The inner brake drum 59 has a cylindrical shape and an annular flange 60 projecting inwardly adjacent the outer portion of the plate 55. The brake drum flange 60 and the plate 55 have a plurality of matching recesses spaced about the perimeter for the springs 61. The spring retainer 62 is secured to the flange 60 and a spring retainer 63 is secured to the plate 55 to retain the springs 61 in the recesses so that the drive from the disc 55 to the drum 59 is transmitted through the springs 61 to damp the relative angular movement and thus reduce vibration and shock. The rotor brake discs 69 which have an annular shape are rotatably secured by a splined connection 70 to the inner drum 59 to rotate with the drive shaft 24. The intermediate or stator brake discs 71 are connected by a suitable spline connection 72 to the cylindrical portion 73 of the brake actuating ring 74. A fixed abutment 79, formed as an integral part of the housing 10, has an annular face engaging one end of the stacked brake discs.

A brake release spring 81 located in the axial bore 82 in the ring gear part 32 and the abutment part of housing portion 11 acts through a rod slidably mounted in the bore to engage the free end of the actuating ring to resiliently urge the ring in a brake releasing direction. The brake actuating ring 74 has a self-energizing cam section 85 at the outer portion of the ring and an annular recess 86 of rectangular section at the inner edge in which the cam apply ring 97 is located.

The cam apply ring 97 is rotatably supported on the ball bearings 87 located in the inner corner of the recess 86. As best shown in Fig. 4 the self-energizing cam portion 85 of brake application member has a series of symmetrical high angle cams 88 cooperating with the rollers 89 which in turn engage the cams 90 on the fixed self-energizing cam 91. The self-energizing brake apply cams 88 and 90 on the actuating ring and the fixed cam ring are preferably equally spaced and have the same high angle on both sides.

The annular apply ring 97 has a series of low angle sloped cams 99 which have rounded terminal portions 100 which fit the apply rollers 101 to provide an abutment limiting movement of the rollers. The fixed apply cam ring 105 is secured to the self-energizing fixed cam 91 by means of the pin 106 which extends through both rings. The cam ring 105 has a plurality of sloped cams 107 terminating in rounded stop portions 108, similar to cam ring 97. The cams 99 of applying cam ring 97 and the cams 107 of fixed cam ring 105 have the same slope but extend in opposite directions from the seats 100 and 108 respectively for the roller 101. Intermediate the cams 99 of cam ring 87 there are a plurality of cutouts 111 which in cooperation with similar cutouts 112 on cam ring 105 between the cams 107 provide clearance between the portions of the cam rings between the balls 101. The rollers 89 and 101 are separated by a cylindrical divider plate 116 which limits their axial movement. Thus the outer roller 89 is confined between the casing 11 and the divider plate 116. An inner baffle 117 which has fingers 118 extending downwardly at the same angle as the ramps to engage the ends of each roller 101 maintains the rollers 101 in position between itself and the divider 116.

The brake is actuated by an internal ring gear 121 formed on the internal surface on the apply cam 97. The ring gear 121 meshes with the spur gear 122 fixed to the shaft 123 which is journalled in a suitable bearing in the transmission wall 13. A brake actuating lever 124 is adjustably secured to the outer end of shaft 123 and suitably connected by a rod or other means 125 to the vehicle brake control mechanism. The fixed synchronizing cam 91 and the fixed brake apply cam 105, which are secured together by the pin 106, are secured to the housing by the bolt 131 which extends through a serrated securing ring 132, the annular wall 13, and is threaded into the cam 91 to secure these parts together. The adjacent corners of the annular wall 13, the cam ring 91 and the adjacent part of the wall of cylindrical housing portion 11 are recessed to receive a locking ring 133 to positively position the annular wall 13 and the cam ring 91 longitudinally with respect to the housing 11. The end of the cylindrical housing portion 11 has a plurality of axially extending teeth 134 which intermesh with a plurality of radially extending teeth 135 on the serrated ring 132 to lock end wall 13 and the cylindrical housing 11 together to prevent relative rotary movement.

The brake cooling fluid as shown in Figs. 1 and 6 is supplied through the drive shaft 24 and is partially diverted by the ball bearing 46 and the narrow passage between sleeve shaft 27 and sleeve 42 so that it flows out through the port or ports 139 in the drive shaft and through the space between the sleeve shaft and the tubular journal 14. A seal 140 located between the drive shaft 24 and tubular journal 14 prevents flow of lubricant back into the transmission or shaft housing 15 so that the oil flows to the paddles 142 located in the space between the disc 55 and a partition 141 where the fluid is thrown centrifugally out toward the brake plates. The fluid flows through a plurality of apertures 143 in the brake drum 59 to lubricate and cool the brake plates. The partition 141 which carries paddles 142 is secured to the brake drum 59 by a key 144 and a split ring 145, and rotates at its inner edge in sealed contact with the outer surface of the tubular journal 14. The cooling oil passes through apertures 143 located about the perimeter of drum 59, between the brake discs 69 and 71, and out between the splines 72 to the annular space 149 between the cylindrical portion 73 of the brake applying ring and the cylindrical housing portion 11. If additional oil flow is desired, the apertures may also be placed in the cylindrical member 73. A recess 150 is provided in the cam 74 and a recess 151 is provided in the cam 91 to connect the annular space 149 to a passage 152 cast in the frame which conveys the fluid to the annular outlet passage 153 located between the shaft 24 and the housing 15. The brake cooling system for this final drive and brake assembly is employed in connection with the transmission 155 of the type disclosed in application Serial No. 314,630, entitled, Sumps for Tanks and Other Similar Types of Vehicle Transmissions, filed October 14, 1952, in the name of Howard W. Christenson. This transmisison as illustrated in Fig. 6 has an oil sump 156 which is connected by a supply passage 157 and through a left-hand check valve 158 and a right-hand check valve 159 to a manifold 160. The manifold 160 has an atmospheric port 163 controlled by valve 164 which is actuated by a brake control mechanism 165. When the brake control is actuated to apply the brakes, the valve 164 is closed and when the brake control is actuated to release the brake, valve 164 is opened. The manifold 160 is connected at one side to the left-hand brake cooling and lubricating pump 166 and at the other side to the right-hand brake cooling and lubricating pump 167. These pumps are connected by suitable lines 168 and 169 respectively to the inside of the outer drive shaft 24 of the respective brake where the cooling oil flows through opening 139 to the brake discs 69 and 71. The transmission housing also has a low pressure or scavenge sump 171 which as explained in the above application S.N. 314,630 collects the leakage oil. This sump is collected by the drain passage 172 via a scavenged pump 173 and passage 174 to the left-hand brake delivery passage 168 and via a pump 176 and passage 177 to the right-hand brake delivery passage 169. The exhaust passage between the shaft 24 and the housing is connected by a passage 189 to the high-pressure sump 191 of the transmission 155.

The final drive of the transmission is transmitted through the shaft 24 to the sun gear shaft 27 which has a gear tooth spline providing the splines for the connection with shaft 24 and the teeth of sun gear 28. The sun gear is freely pivoted on the bearing 46 so that it floats in mesh with the three planetary pinions and may move radially to find the proper center to distribute the load on the teeth of the three planetary pinions. The carrier 30, which supports the pinions is drivingly connected to the output shaft 35. The ring gear of the planetary gear set which meshes with the planetary pinions 29 is formed as a cylindrical portion of the housing.

The disc brake has an inner drum 59 which is connected to the drive shaft and sun gear shaft 27 through a set of torsional vibration damper springs 61 located between the rotor drum 59 and the support plate 55. When the brake is applied the brake control mechanism 125 rotates the lever 124 which in turn rotates pinion 122 and the gear sector 121 located on the brake apply cam 97. Actuation of the control mechanism in the drive 125 will rotate the cam 97 upwardly as viewed in Fig. 5. This movement of the cam 97 will tend to cause the rollers 101 to roll the incline of the cams 99 and 107 and to separate the cam apply ring 97 and the fixed cam ring 105. The apply cams 99 and 107 preferably have an incline of about 25 to 30 degrees from a transverse plane. This low angle provides a high mechanical advantage between the control mechanism and the movable brake abutment or pressure plate. Thus, axial thrust will be transmitted from the apply ring 97 through the ball bearing 87 to the brake applying cam ring 74. The other face of the applying cam 74 has the annular movable abutment face which engages the end brake disc and slides the brake discs together axially to engage the brake. As the brake is engaged with a low apply force by the brake apply ring 97 and its associated apply cam rollers 101 the movable abutment 84 rotates in the direction of rotation of the main shaft. The rotation of the rotatable abutment 84 causes the self-energizing cam ring 85 to rotate and engage the alternate rollers 89 between the high angle cams 88 and 90 which make an angle of about 70 to 75 degrees with a transverse plane. These high angle cams limit the self-energizing braking force to avoid locking. It will be seen that when the cam 85 rotates in one direction the alternate rollers are engaged between the cam members 88 and 90 and when the cam 85 rotates in the other direction the intermediate rollers are engaged between cams 88 and 90.

In Fig. 6 it will be seen that the fluid for the brake cooling system is delivered from the engine sump 156 through supply passage 157 and the check valves 158 and 159 via manifold 160 to the left-hand brake pump 166 and to the right-hand brake pump 167. The scavenge pumps 173 and 176 which continually scavenge the low-pressure chamber 171 of the transmission housing of leakage oil continuously pump a large volume of air and a little oil. These pumps are connected to the passages 168 and 169 to deliver oil to the left-hand and right-hand brake, respectively. The air and cooling oil is delivered through the hollow drive shaft 24. The oil passes through the opening 139 to the passage between the plate 55 and the partition 141 where the vanes 142 centrifugally pump the oil outwardly through the holes 143 in the drum 59 and tend to keep the brake discs 69 and 71 submerged in a body of oil and to provide pressure to help circulate the oil through the outlet passages to the transmission sump 191. The outlet passages comprise the recesses 150, 151 at the base of the sump, the radial outlet passage 152, the passage between the sleeve shaft 24 and the housing portion 14, and a suitable conduit 189 to return the oil to the high-pressure sump portion 191 of the transmission 155. The valve 164 is connected to the brake control mechanism by a suitable linkage 165 so that the valve is opened whenever the brakes are released in order to permit air to enter the manifold 160 so that the pumps 166, 167 pump air through the brakes and remove the oil. When the brakes are released the high volume flow of cooling oil is not needed to cool the brakes. Furthermore, there would be a large friction loss because of the pumping and churning of the oil which would occur during normal operation if the brake were submerged in oil. Thus the brake sump outlet 152 is located at the bottom of the sump and the air pressure generated by the pumps 166 and 167 and the scavenge pumps 173 and 176 is sufficient to scavenge the oil out of the brake housing through pasages 152 and 189 to the sump 191. During normal operation or with the brake released, it is desired that some oil be admitted to the brake housing to lubricate the brake and the gearing. Some oil is provided from the leakage oil in the low pressure sump 171 which is connected via pumps 173 and 176 to the brakes. If additional lubricating oil is desired it may be supplied by providing a constant leak or by-pass through or around the check valves 158 and 159.

It is understood that the above described preferred embodiments of the invention may be modified within the scope of the invention as defined in the appended claims.

We claim:

1. In a drive assembly, a housing, a first shaft rotatably mounted in said housing, a second shaft, bearing means rotatably mounting said second shaft in said housing, said bearing means preventing axial movement of said second shaft and preventing eccentric movement of one portion of said second shaft and permitting swinging movement of said one portion to permit eccentric movement of another portion of said second shaft, a ring gear member, a carrier member, a plurality of planetary pinions rotatably mounted on said carrier member, one of said members mounted on said housing, the other of said members mounted on said first shaft, said sun gear being mounted on said another portion of said second shaft for eccentric movement to rotate on said planetary pinions about the center of said planetary pinions to equalize the tooth load on said pinions.

2. In a drive assembly, a housing, a first shaft rotatably mounted in said housing, a second shaft, bearing means rotatably mounting said second shaft on said first shaft, said bearing means preventing axial movement of said second shaft and preventing eccentric movement of one portion of said second shaft and permitting swinging movement of said one portion to permit eccentric movement of another portion of said second shaft, a ring gear member, a carrier member, a plurality of planetary pinions rotatably mounted on said carrier member, one of said members mounted on said housing, the other of said members mounted on said first shaft, said sun gear being mounted on said another portion of said second shaft for eccentric movement to rotate on said planetary pinions about the center of said planetary pinions to equalize the tooth load on said pinions.

3. In a drive assembly, a housing, an output shaft in said housing, bearing means in said housing rotatably supporting said output shaft, an input sleeve shaft concentrically mounted on a portion of said output shaft and said input sleeve shaft and output shaft having concentric portions, bearing means rotatably supporting said input sleeve shaft on said portion of said output shaft in a fixed axial position and having means permitting radial movement of a portion of said input sleeve shaft relative to said output shaft, said concentric portion of the input sleeve shaft having a larger inner diameter than said concentric portion of the output shaft to permit said radial movement, a sun gear on said portion of the input sleeve shaft, a planetary carrier mounted on said output shaft, a plurality of pinions on said planetary carrier meshing with said sun gear to center said sun gear and input sleeve shaft relative to said carrier, and a ring gear meshing with said planetary pinions and fixed to said housing.

4. In a brake assembly, a shaft, a drive plate secured to said shaft to rotate with said shaft, a rotor drum mounted on said plate, torsional vibration damper means interconnecting said drum and said drive plate, a stack of brake discs, the alternate discs of said stack of brake discs being secured to said rotor drum, a stator drum, the intermediate discs of said stack of brake discs being secured to said stator drum, a fixed abutment engaging one end of said stack of discs, a movable abutment secured to said stator drum engaging the other end of the stack of discs, a brake apply ring rotatably mounted on said movable abutment and having low angle apply cams, a fixed brake apply cam ring facing said movable brake apply cam ring and having low angle cams facing said low angle cams on said brake applying ring, means between said brake apply ring cams and said fixed brake apply ring cams to separate said rings in response to movement of said brake apply ring in one direction, a fixed brake abutment ring facing said movable brake abutment ring, and self-energizing high angle cam means located on said fixed brake abutment ring and said movable brake abutment ring to further separate said rings upon relative movement in either direction.

5. In a brake and drive assembly, a housing, a shaft in said housing, bearing means in said housing rotatably supporting said shaft, a sleeve shaft concentrically on a portion of said shaft, bearing means rotatably supporting said sleeve shaft on said portion of said shaft in a fixed axial position and permitting radial movement of a portion of said sleeve shaft, the concentric portions of said portion of the sleeve shaft having a larger inner diameter than the concentric portion of said shaft to permit said radial movement, a sun gear on said portion of said sleeve shaft, a planetary carrier mounted on said shaft, a plurality of pinions on said planetary carrier meshing with said sun gear to center said portion of said sleeve shaft, a ring gear meshing with said planetary pinions and fixed to said housing, a non-rotating brake member on said housing, a rotating brake member fixed to said portion of said sleeve shaft, to center said rotating brake member with respect to said non-rotating brake member, and means to engage said brake members.

6. In a brake assembly, a housing, a shaft, a non-rotating brake member mounted on said housing coaxially with said shaft, a rotary brake member coaxially supported only on said shaft, means to engage said rotary and non-rotary brake members to apply the brake, bearing means mounted on said housing and secured to said shaft adjacent one end to rotatably support said one end of said shaft, said rotary brake member being supported on said shaft at a point spaced from said bearing, a gear coaxially mounted on said shaft adjacent the other end of said shaft, and gear means mounted in said housing coaxially with said shaft and cooperating with said gear to rotatably support said other end of said shaft.

7. In a brake assembly, a housing, a shaft, a non-rotating brake member mounted on said housing coaxially with said shaft, a rotary brake member coaxially supported only on said shaft intermediate the ends, means to engage said rotary and non-rotary brake members to apply the brake, bearing means mounted on one end of said housing to rotatably support one end of said shaft, a gear coaxially mounted on the other end of said shaft, and gear means mounted on said one end of said housing coaxially with said shaft and cooperating with said gear to rotatably support said other end of said shaft.

8. In a brake assembly, a cylindrical housing, a shaft rotatably mounted concentrically in said cylindrical housing, a rotor drum mounted to rotate with said shaft, a stack of brake discs, the alternate discs of said stack of brake discs being secured to said rotor drum, a stator mounted for rotary and longitudinal movement on the internal surface of said cylindrical housing having a drum portion, the intermediate discs of said stack of brake discs being secured to said stator drum portion, a fixed abutment secured to said housing engaging one end of said stack of discs, said stator having a face engaging the other end of said stack of discs and an opposite face having an annular cam surface and an annular recess, a rotary brake apply ring rotatably mounted in said recess in said movable abutment, a fixed brake apply cam ring facing said movable brake apply cam ring, first cam and roller means between said rotary brake apply ring and said fixed brake apply ring to separate said rings in response to movement of said rotary brake apply ring in one direction to longitudinally move said stator to initially engage said brake discs to rotate said stator, a fixed cam abutment ring facing said opposite face, and second cam and roller means located between said fixed cam abutment ring and said stator to separate said cam abutment ring and stator to further move said stator to fully apply the brake in response to movement in either direction and to stop the rotation of said stator.

9. In a brake assembly, a cylindrical housing a shaft rotatably mounted concentrically in said cylindrical housing, a rotor drum mounted to rotate with said shaft, a stack of brake discs, the alternate discs of said stack of brake discs being secured to said rotor drum, a stator drum mounted for rotary and longitudinal movement on the internal surface of said cylindrical housing having a drum portion, the intermediate discs of said stack of brake discs being secured to said stator drum portion, a fixed abutment secured to said housing engaging one end of said stack of discs, said stator having a face engaging the other end of said stack of discs and an opposite face having an annular cam surface and an annular recess, a rotary brake apply ring rotatably mounted in said recess in said movable abutment, first cam and roller means between said rotary brake apply ring and said housing to longitudinally move said rotary brake apply ring and said stator in response to movement of said rotary brake apply ring in one direction to initially engage said brake discs to rotate said stator, and second cam and roller means located between said housing and said stator to separate said housing and stator to further move said stator to fully apply the brake in response to movement in either direction and to stop rotation of said stator.

10. In a brake assembly, a shaft, a rotor drum mounted to rotate with said shaft, a stack of brake discs, the alternate discs of said stack of brake discs being secured to said rotor drum, a stator drum, the intermediate discs of said stack of brake discs being secured to said stator drum, a fixed abutment engaging one end of said stack of discs, a movable abutment secured to said stator drum engaging the other end of the stack of discs, a brake apply ring rotatably mounted on said movable abutment, a fixed brake apply cam ring facing said movable brake apply cam ring, low angle cam and roller means between said brake apply ring and said fixed brake apply ring to separate said rings in response to movement of said brake apply ring in one direction and to limit rotation of said brake apply ring in response to movement in the other direction, a fixed brake abutment ring facing said movable brake abutment ring, and self-energizing high angle cam means located on said fixed brake abutment ring and said movable brake abutment ring to further separate said rings upon relative movement in either direction.

11. In a brake assembly, a shaft, a drive plate secured to said shaft to rotate with said shaft, a rotor drum having apertures mounted on said plate, torsional vibration damper means interconnecting said rotor drum and said drive plate, a stack of brake discs, the alternate discs of said stack of brake discs being secured to said rotor drum, a stator drum, the intermediate discs of said stack of brake discs being secured to said stator drum, a fixed abutment engaging one end of said stack of discs, a movable abutment ring secured to said stator drum engaging the other end of the stack of discs, a rotary apply ring rotatably mounted on said movable abutment and having cam means, a fixed apply ring facing said rotary apply ring and having cam means facing said cam means on said rotary apply ring, roller means cooperating with said cam means on said rotary apply ring and said fixed apply ring to separate said rings in response to movement of said rotary apply ring in one direction and to limit relative movement in the opposite direction without separating said rings, a fixed abutment ring facing said movable abutment ring, self-energizing cam and roller means located on said fixed abutment ring and said movable abutment ring to further separate said rings upon relative movement in either direction to apply said brake discs, resilient means engaging said stator drum to release said brake discs, and annular partition secured within said rotor drum, said drive plate being located at one side of said rotor drum and said annular partition being located at the other side of said rotor drum to provide a passage therebetween, vanes mounted in said passage to rotate with said rotor drum to act as a centrifugal pump to supply oil through said apertures in said rotor drum to said brake discs, and means to supply oil to said passage.

12. In a brake cooling system, a brake housing, a brake having annular friction means, and final drive gearing in said housing, a liquid supply sump, a brake cooling pump, a supply passage connecting said liquid supply sump to said brake cooling pump, a delivery passage connecting said brake cooling pump to said brake, a centrifugal pump in said passage located concentrically within said annular friction means, a check valve in said supply passage permitting flow in one direction from said liquid sump to said brake cooling pump, valve means connected to said supply passage to admit air to said supply passage when said valve means is open to supply air to the brake cooling pump and to exclude air when the valve is closed to supply liquid from said liquid supply sump through said check valve to said brake cooling pump, and brake control means connected to said brake to actuate said brake and to said valve means to close said valve means when said brake is applied and to open said valve means when said brake is released.

13. In a brake cooling system, a brake housing, a brake in said housing, a liquid supply sump, a brake cooling pump, a supply passage connecting said liquid supply sump to said brake cooling pump, a delivery passage connecting said brake cooling pump to said brake, a check valve in said supply passage permitting flow in one direction from said fluid sump to said brake cooling pump, valve means connected to said supply passage between said check valve and said brake cooling pump to admit air when said valve means is open to supply air to the brake cooling pump and to exclude air when the valve is closed to supply liquid from said liquid supply sump through the check valve to the brake cooling pump, and brake control means connected to said brake to actuate said brake and to said valve means to close said valve means when said brake is applied and to open said valve means when said brake is released.

14. In a final drive assembly, a housing, a brake in said housing, a liquid supply sump, a brake cooling pump, a supply passage connecting said liquid supply sump to said brake cooling pump, a delivery passage connecting said brake cooling pump to said brake, a check valve in said supply passage permitting flow in one direction from said liquid sump to said brake cooling pump, valve means connected to said supply passage between said check valve and said pump to admit air when said valve means is open to supply air to the brake cooling pump and to exclude air when the valve is closed to supply liquid from said liquid supply sump through the check valve to the brake cooling pump, brake control means connected to said brake to actuate said brake and to said valve means to close said valve means when said brake is applied and to open said valve means when said brake is released, and said check valve having by-pass means to permit a small quantity of fluid to be supplied to lubricate said brake at all times.

15. In a final drive assembly, a housing, a brake in said housing, a liquid supply sump, an air and leakage liquid sump, a brake cooling pump, a supply passage connecting said liquid supply sump to said brake cooling pump, a delivery passage connecting said brake cooling pump to said brake, a scavenge pump having an inlet connected to said air and leakage liquid sump to scavenge the leakage liquid and a large volume of air from said air and leakage liquid sump, said scavenge pump having an outlet connected to said delivery passage, a check valve in said supply passage permitting flow in one direction from said liquid sump to said brake cooling pump, valve means connected to said supply passage between said check valve and said brake cooling pump to admit air when said valve means is open to supply air to the brake cooling pump and to exclude air when the valve is closed to supply liquid from the liquid supply sump through said check valve to the brake cooling pump, brake control means connected to said brake to actuate said brake and to said valve means to close said valve means when said brake is applied and to open said valve means when said brake is released.

16. In a final drive assembly, a housing, a brake in said housing, a liquid supply sump, an air and leakage liquid sump, a brake cooling pump, a supply passage connecting said liquid supply sump to said brake cooling pump, a delivery passage connecting said brake cooling pump to said brake, a scavenge pump connected to said air and leakage liquid sump having a large capacity to scavenge the leakage liquid and a large volume of air from said air and leakage liquid sump, said scavenge pump being connected to said delivery passage, a check valve in said supply passage permitting flow in one direction from said liquid sump to said brake cooling pump, valve means connected to said supply passage between said check valve and said brake cooling pump to admit air when said valve means is open to supply air to the brake cooling pump and to exclude air when the valve is closed to supply liquid from said liquid supply sump through the check valve to the brake cooling pump, brake control means connected to said brake to actuate said brake and to said valve means to close said valve means when said brake is applied and to open said valve means when said brake is released, and said check valve having by-pass means to permit a small quantity of liquid to be supplied to lubricate said brake at all times.

17. In a brake assembly, a cylindrical housing having an end wall, a ring gear mounted concentrically within said housing adjacent said end wall, a brake stator mounted concentrically within said housing adjacent said ring gear, a shaft located in said housing rotatably supported on said end wall and extending beyond said ring gear and brake stator, a sleeve shaft rotatably mounted on said shaft by a bearing located beyond said brake stator, a brake rotor mounted on said sleeve shaft cooperating with said brake stator, a sun gear fixed on said sleeve shaft adjacent said brake rotor, a plurality of planetary pinions mounted on a carrier meshing with said ring gear and said sun gear to concentrically support said sleeve shaft with said ring gear and cylindrical housing and to concentrically support said brake rotor with said brake stator and cylindrical housing.

18. In a brake assembly, a cylindrical housing having an end wall, a ring gear mounted concentrically on said housing and located in said housing adjacent said end wall, a brake stator mounted concentrically on said housing and located in said housing adjacent said ring gear, a shaft located in said housing rotatably supported on said end wall and extending beyond said brake stator, a sleeve shaft rotatably mounted on said shaft by a bearing located beyond said brake stator permitting relative lateral movement of said sleeve shaft with respect to said shaft, a brake rotor mounted on said sleeve shaft cooperating with said brake stator, a sun gear fixed on said sleeve shaft adjacent said brake rotor, a plurality of planetary pinions mounted on a carrier meshing with said ring gear and said sun gear to concentrically support said sleeve shaft with said ring gear and cylindrical housing and to concentrically support said brake rotor with said brake stator and cylindrical housing.

19. In an assembly of the character described, a housing, a mechanism having an operative position in which it requires a high volume of lubrication and an inoperative position in which it requires a lesser volume of lubrication, a liquid supply sump, a pump, a supply passage connecting said liquid supply sump to said pump, a delivery passage connecting said pump to said mechanism, valve means connected to said supply passage between said liquid supply sump and said pump to admit air when said valve means is open to supply air to said pump and to exclude air when the valve is closed to supply liquid from said liquid supply sump to said pump, and control means connected to said mechanism to actuate said mechanism and to said valve means to close said valve means when said mechanism is operative and to open said valve means when said mechanism is inoperative.

20. In an assembly of the character described, a mechanism having an operative position in which it requires a high volume of lubrication and an inoperative position in which it requires a lesser colume of lubrication, a liquid supply sump, a pump, a supply passage connecting said liquid supply sump to said pump, a delivery passage connecting said pump to said mechanism to cool and lubricate said mechanism, a check valve in said supply passage permitting flow in one direction from said liquid sump to said pump, valve means connected to said supply passage between said check valve and said pump to admit air when said valve means is open to supply air to said pump and to exclude air when the valve is closed to supply liquid from said liquid supply sump through said check valve to said pump, control means connected to said mechanism to actuate said mechanism and to said valve means to close said valve means when said mechanism is operative and to open said valve means when said mechanism is inoperative, and said check valve having by-pass means to permit a small quantity of fluid to be supplied to lubricate said mechanism at all times.

21. In an assembly of the character described a mechanism having an operative position in which it requires a high volume of lubrication and an inoperative position in which it requires a lesser volume of lubrication, a main sump supplied with a large volume of liquid, a secondary sump supplied with a small volume of liquid, a main pump, a supply passage connecting said main sump to said main pump, a delivery passage connecting said main pump to said mechanism, a scavenge pump connected to said secondary sump having a capacity larger than the supply to said secondary sump to scavenge said secondary sump pumping said small volume of liquid and a volume of air from said secondary sump, said secondary pump being connected to said delivery passage, a check valve in said supply passage permitting flow in one direction from said main sump to said main pump, valve means connected to said supply passage between said check valve and said main pump to admit air when said valve means is open to supply air to said main pump and to exclude air when the valve is closed to supply liquid from the main sump through the check valve to the main pump, control means connected to said mechanism to actuate said mechanism and to said valve means to close said valve means when said mechanism is operative and to open said valve means when said mechanism is inoperative, and said check valve having by-pass means to permit a small quantity of fluid to be supplied to lubricate said mechanism at all times.

22. In an assembly of the character described, a pressurizeable housing having a liquid collecting sump portion, a mechanism having an operative position in which it requires a high volume of lubrication and an inoperative position in which it requires a lesser volume of lubrication, a liquid supply sump, a pump, a supply passage connecting said liquid supply sump to said pump, a delivery passage connecting said pump into said housing to supply cooling and lubricating liquid to said mechanism, means permitting said liquid to drain to said collecting portion, a return passage connecting said liquid collecting sump portion to said liquid supply sump, a pump, valve means for said supply passage between said liquid supply sump and said pump to admit air when said valve means is open to supply air to said pump and through said supply passage to said housing to pressurize said housing to force the liquid out through said return passage to said liquid supply sump and to unload said pump and to exclude air when the valve is closed to supply liquid from said liquid supply sump to said pump and through said supply passage into said housing to said mechanism, and control means connected to said mechanism to actuate said mechanism and to said valve means to close said valve means when said mechanism is operative and to open said valve means when said mechanism is inoperative.

23. The invention defined in claim 22 and said valve means having by-pass means to permit a small quantity of fluid to be supplied to lubricate said mechanism at all times.

24. In a brake assembly, a housing, a shaft rotatably mounted in said housing, a perforated rotor drum mounted to rotate with the said shaft and spaced therefrom, a plurality of brake discs, the alternate discs of said plurality of brake discs being secured to the external surface of said rotor drum, a stator drum fixed in said housing, the intermediate discs of said plurality of brake discs being secured to said stator drum, a fixed abutment engaging one end of said plurality of discs, a movable abutment engaging the other end of said plurality of discs, brake apply means operably connected to said movable abutment to apply the brake, a plurality of centrifugal pump vanes mounted adjacent the internal surface of said rotor drum to rotate with said shaft and rotor drum acting as a centrifugal pump, a sump, means to supply fluid from said sump to a point in said housing concentrically within said vanes and rotor drum, a return passage connecting a low point in said housing to said sump, said vanes on rotation of said shaft causing fluid to flow from the center of said housing through said perforations in said rotor drum to maintain said plurality of brake discs submerged in fluid and to circulate fluid through said return passage to said sump.

25. In a brake assembly, a housing, a brake mechanism including a shaft rotatably mounted in said housing, a rotor drum having a fluid passage extending through the drum and mounted to rotate with the said shaft and spaced therefrom, a plurality of brake discs, some of said brake discs being secured to the external surface of said rotor drum, a stator drum fixed in said housing, other of said brake discs being secured to said stator drum, and brake apply means operably connected to said brake discs to apply the brake, a plurality of centrifugal pump vanes mounted within said rotor drum to rotate with said shaft and rotor drum acting as a centrifugal pump, a sump, means to supply fluid from said sump to a point in said housing concentrically within said vanes and rotor drum, said housing providing a fluid enclosure surrounding said brake mechanism, a return passage connecting a low point in said housing to said sump, said vanes on rotation of said shaft causing fluid to flow from the center of said housing through said passages in said rotor drum and said return passage controlling the flow to maintain said plurality of brake discs submerged in fluid and to circulate fluid through said return passage to said sump.

26. In a brake assembly, a housing, a nonrotating brake stator mounted on said housing, a planetary gear unit consisting of a ring gear, a sun gear member and a carrier member having pinions meshing with said sun gear member and ring gear, said ring gear being mounted on said housing coaxially with said nonrotating brake stator, a shaft bearing means rotatably mounting said shaft on said housing permitting lateral movement, one of said members being coaxially mounted on said shaft at a point spaced from said bearing means, said one of said members concentrically supporting said shaft with respect to said ring gear, and a brake rotor coaxially mounted on said second shaft at a point spaced from said bearing means and located for cooperation with said brake stator to support said brake rotor through said gearing on said housing concentrically with respect to said brake stator.

27. In a brake assembly, a housing, a nonrotating brake stator mounted on said housing, a ring gear member mounted on said housing coaxially with said nonrotating brake stator, a carrier having pinions meshing with said ring gear, a shaft bearing means rotatably mounting said shaft on said housing permitting lateral movement, a sun gear coaxially mounted on said shaft at a point spaced from said bearing means, said sun gear meshing with said pinions to concentrically support said shaft with respect to said ring gear, and a brake rotor coaxially mounted on said second shaft at a point spaced from said bearing means and located for cooperation with said brake stator to support said brake rotor through said gearing on said housing concentrically with respect to said brake stator.

28. In a brake assembly, a housing, a nonrotating brake stator mounted on said housing, a ring gear member mounted on said housing coaxially with said nonrotating brake stator, a first shaft mounted on said housing substantially coaxially with said ring gear, a carrier having pinions meshing with said ring gear mounted on said first shaft, a second shaft, bearing means rotatably mounting said second shaft on said first shaft permitting limited lateral movement, a sun gear coaxially mounted on said second shaft at a point spaced from said bearing means, said sun gear meshing with said pinions to concentrically support said second shaft with respect to said ring gear, and a brake rotor coaxially mounted on said second shaft at a point spaced from said bearing means and located for cooperation with said brake stator to support said brake rotor through said gearing on said housing concentrically with said brake stator.

29. In a brake assembly, a cylindrical housing, a ring gear mounted concentrically within said housing, planet gears mounted on a carrier element meshing with said ring gear and a sun gear element meshing with said planet gears, a brake stator mounted concentrically within said housing adjacent said ring gear, a shaft located in said housing rotatably supported on said housing at one side of said brake stator and ring gear and extending concentrically through said brake stator and ring gear, one of said elements being concentrically fixed on said shaft adjacent said brake rotor to concentrically support said sleeve shaft with respect to said ring gear, brake stator and cylindrical housing and a brake rotor concentrically mounted on said shaft to concentrically support said brake rotor with respect to said brake stator and cylindrical housing.

30. In a drive assembly, a housing, a first shaft in said housing, bearing means in said housing rotatably supporting said first shaft for rotation about an axis, a sun gear, a ring gear member, a planetary carrier member, a plurality of pinions on said planetary carrier member meshing with said sun gear and ring gear members, one of said members being substantially coaxially connected to said first shaft, the other of said members being mounted substantially coaxially on said housing, and said sun gear being entirely radially supported by said sun gear meshing with said planetary pinions providing for free radial displacement movement of said sun gear relative to said axis to provide a floating support for said sun gear at the center of said plurality of planetary pinions to equalize the tooth load between each of said planetary pinions and said sun gear.

31. In a drive assembly, a housing, a first shaft in said housing, bearing means in said housing rotatably supporting said first shaft for rotation about an axis, a second shaft, a sun gear fixed on one portion of said second shaft, a ring gear member, a planetary carrier member, a plurality of pinions on said planetary carrier member meshing with said sun gear and ring gear members, one of said members being substantially coaxially connected to said first shaft, the other of said members being mounted substantially coaxially on said housing, said sun gear being entirely radially supported by said sun gear meshing with said planetary pinions providing for free radial displacement movement of said sun gear relative to said axis to provide a floating support for rotation of said sun gear about the center of said plurality of planetary pinions to equalize the tooth load between each of said planetary pinions and said sun gear, and bearings means supporting another portion of said second shaft axially spaced from said one portion for rotaation substantially about said axis and for universal pivotal movement about a point on said axis at said another portion of said second shaft to mount said one portion of said second shaft for rotation about adjacent axes and for free swinging movement tranverse to said axis to permit said sun gear to float in contact with the said planetary pinions.

References Cited in the file of this patent

UNITED STATES PATENTS

| | | |
|---|---|---|
| 405,680 | Rider | June 18, 1889 |
| 854,720 | Dawson | May 28, 1907 |
| 2,024,328 | Batie | Dec. 17, 1935 |
| 2,054,377 | Havill et al. | Sept. 15, 1936 |
| 2,238,943 | MsCune et al. | Apr. 22, 1941 |
| 2,467,980 | Lambert | Apr. 19, 1949 |
| 2,471,858 | Bloomfield | May 31, 1949 |
| 2,505,002 | Orr | Apr. 25, 1950 |
| 2,543,811 | Snow et al. | Mar. 6, 1951 |
| 2,690,248 | McDowall | Sept. 28, 1954 |
| 2,759,376 | Chamberlin et al. | Aug. 21, 1956 |
| 2,786,560 | Ishoy | Mar. 26, 1957 |

FOREIGN PATENTS

| | | |
|---|---|---|
| 579,061 | Germany | June 21, 1933 |

UNITED STATES PATENT OFFICE
CERTIFICATION OF CORRECTION

Patent No. 2,953,040                             September 20, 1960

Howard W. Christenson et al.

It is hereby certified that error appears in the above numbered patent requiring correction and that the said Letters Patent should read as corrected below.

Column 7, line 48, after "concentrically" insert -- mounted --; column 11, line 50, for "colume" read -- volume --; column 14, list of references cited, under "UNITED STATES PATENTS", add the following:

| | | | |
|---|---|---|---|
| 1,380,584 | Parker | June | 7, 1921 |
| 1,859,280 | Corbin | May | 24, 1932 |
| 2,102,181 | McCormick | Dec. | 14, 1937 |
| 2,127,557 | Ells | Aug. | 23, 1938 |
| 2,262,708 | Lambert | Nov. | 11, 1941 |
| 2,353,814 | DePew | July | 18, 1944 |
| 2,384,448 | Banker | Sept. | 11, 1945 |
| 2,386,220 | Lawler et al. | Oct. | 9, 1945 |
| 2,407,699 | Hill | Sept. | 17, 1946 |
| 2,655,054 | Kelley | Oct. | 13, 1953 |
| 2,711,656 | Smirl | June | 28, 1955 |
| 2,743,627 | Christenson | May | 1, 1956 | same column 14, under "FOREIGN PATENTS" add the following:

273,578   Switzerland --------- May    16, 1951

Signed and sealed this 27th day of June 1961.

(SEAL)
Attest:

ERNEST W. SWIDER                               DAVID L. LADD
Attesting Officer                                Commissioner of Patents